(12) United States Patent
Zalalutdinov et al.

(10) Patent No.: US 7,654,140 B2
(45) Date of Patent: Feb. 2, 2010

(54) HEAT PUMPED PARAMETRIC MEMS DEVICE

(75) Inventors: Maxim Zalalutdinov, Ithaca, NY (US); Anatoli Olkhovets, Ithaca, NY (US); Alan T. Zehnder, Ithaca, NY (US); Bojan Ilic, Ithaca, NY (US); David Alan Czaplewski, Ithaca, NY (US); Lidija Sekaric, Ithaca, NY (US); Jeevak M. Parpia, Ithaca, NY (US); Harold G. Craighead, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 751 days.

(21) Appl. No.: 10/097,178

(22) Filed: Mar. 12, 2002

(65) Prior Publication Data

US 2003/0173864 A1     Sep. 18, 2003

(51) Int. Cl.
*G01N 29/12* (2006.01)
(52) U.S. Cl. ................ 73/579; 73/504.18; 73/655
(58) Field of Classification Search .............. 73/579, 73/596, 655, 662, 862.59, 862.68, 862.637, 73/862.639, 504.12, 504.15, 504.18, 505, 73/517 R, 862.69; 310/348, 319, 309; 333/186, 333/197, 199; 331/154
See application file for complete search history.

(56) References Cited

U.S. PATENT DOCUMENTS

| | | | | |
|---|---|---|---|---|
| 2,716,887 | A * | 9/1955 | Smith | 73/579 |
| 4,306,456 | A * | 12/1981 | Maerfeld | 73/514.28 |
| 4,355,286 | A * | 10/1982 | Knobbe et al. | 330/56 |
| 4,430,895 | A * | 2/1984 | Colton | 73/497 |
| 4,450,377 | A * | 5/1984 | Briese | 310/348 |
| 4,562,740 | A * | 1/1986 | Webber et al. | 73/651 |
| 4,598,587 | A * | 7/1986 | Dwyer et al. | 73/514.13 |
| 4,607,341 | A * | 8/1986 | Monchalin | 702/136 |

(Continued)

FOREIGN PATENT DOCUMENTS

JP     2002229086     *     8/2002

(Continued)

OTHER PUBLICATIONS

Carr, Dustin W., et al., "Measurement of mechanical resonance and losses in nanometer scale silicon wires", *Applied Physics Letters*, 75 (7), (Aug. 16, 1999), 920-922.

(Continued)

*Primary Examiner*—J M Saint Surin
(74) *Attorney, Agent, or Firm*—Schwegman, Lundberg & Woessner, P.A.

(57) ABSTRACT

A micro-electrical mechanical oscillator has a resonant frequency of oscillation that is varied by application of heat. The resonant frequency is varied at a frequency different from the resonant frequency of the oscillator to amplify oscillations. In one embodiment, the oscillator is disc of material supported by a pillar of much smaller diameter than the disc. The periphery of the disc is heated by a laser to provide a time varying shift of the resonant frequency (or equivalently the stiffness) of the disc. Feedback from movement of the disc is used to modulate the intensity of the laser, and thus the stiffness of the disc to provide parametric amplification of sensed vibrations, using heating as a pump. Various other shapes of micro-electrical mechanical oscillators are used in other embodiment, including an array of such oscillators on a substrate, each having different resonant frequencies.

14 Claims, 6 Drawing Sheets

U.S. PATENT DOCUMENTS

| | | | | | |
|---|---|---|---|---|---|
| 5,020,370 | A | * | 6/1991 | Deval et al. | 73/514.29 |
| 5,063,782 | A | * | 11/1991 | Kellett | 73/514.34 |
| 5,090,254 | A | * | 2/1992 | Guckel et al. | 73/862.59 |
| 5,267,471 | A | * | 12/1993 | Abraham et al. | 73/105 |
| 5,352,635 | A | * | 10/1994 | Tu et al. | 438/53 |
| 5,450,751 | A | * | 9/1995 | Putty et al. | 73/504.18 |
| 5,719,324 | A | * | 2/1998 | Thundat et al. | 73/24.01 |
| 5,804,709 | A | * | 9/1998 | Bourgoin et al. | 73/105 |
| 5,856,722 | A | * | 1/1999 | Haronian et al. | 310/321 |
| 5,889,357 | A | * | 3/1999 | Yachi et al. | 310/344 |
| 5,909,456 | A | * | 6/1999 | Oka | 372/22 |
| 6,006,593 | A | * | 12/1999 | Yamanaka | 73/105 |
| 6,035,719 | A | * | 3/2000 | Toyota | 73/649 |
| 6,124,933 | A | * | 9/2000 | Mizutani et al. | 356/620 |
| 6,134,257 | A | * | 10/2000 | Capasso et al. | 372/94 |
| 6,363,090 | B1 | * | 3/2002 | Wintner et al. | 372/21 |
| 6,369,374 | B1 | | 4/2002 | Greywall | |
| 6,497,141 | B1 | * | 12/2002 | Turner et al. | 73/105 |
| 6,628,177 | B2 | * | 9/2003 | Clark et al. | 333/186 |
| 6,630,871 | B2 | * | 10/2003 | Ma et al. | 331/116 M |
| 6,788,175 | B1 | * | 9/2004 | Prophet | 335/78 |
| 6,834,064 | B1 | * | 12/2004 | Paschotta et al. | 372/30 |
| 6,859,113 | B2 | * | 2/2005 | Giousouf et al. | 331/154 |
| 6,903,489 | B2 | * | 6/2005 | Suzuki et al. | 310/320 |
| 7,215,061 | B2 | | 5/2007 | Kihara et al. | |
| 2003/0085779 | A1 | * | 5/2003 | Ma et al. | 333/188 |
| 2004/0055380 | A1 | * | 3/2004 | Shcheglov et al. | |
| 2005/0225413 | A1 | * | 10/2005 | Kozicki et al. | 335/78 |
| 2006/0162455 | A1 | * | 7/2006 | Kawakatsu | 73/579 |
| 2007/0269901 | A1 | * | 11/2007 | Armani et al. | 436/172 |

OTHER PUBLICATIONS

Carr, Dustin W., et al., "Parametric amplification in a torsional microresonator", *Applied Physics Letters*, 77(10), (Sep. 4, 2000), 1545-1547.

Caves, Carlton M., "Quantum limits on noise in linear amplifiers", *Physical Review D (Particles and Fields)*, 26(8), (Oct. 15, 1982), 1817-1839.

Churenkov, A. V., "Photothermal excitation and self-excitation of silicon microresonators", *Sensors and Actuators A*, 39(2), (Nov. 1993), 141-148.

Dilella, D., et al., "A micromachined magnetic-field sensor based on an electron tunneling displacement transducer", *Sensors and Actuators A*, A86(1-2), (Oct. 30, 2000), 8-20.

Hsu, Wan-Thai, et al., "A sub-micron capacitive gap process for multiple-metal-electrode lateral micromechanical resonators", *Technical Digest. MEMS 2001. 14th IEEE International Conference on Micro Electro Mechanical Systems*, (Jan. 21-25, 2001), 349-352.

Ilic, B., "Mechanical resonant immunospecific biological detector", *Applied Physics Letters*, 77(3), (2000), 450-452.

Liu, cheng-Hsien, et al., "Characterization of a high-sensitivity micromachined tunneling accelerometer with micro-g resolution", *Journal of Microelectromechanical Systems*, 7(2), (1998), 235-244.

Lohndorf, Markus, et al., "Microcantilever torque magnetometry of thin magnetic films", *Journal of Applied Physics*, 87(9), (May 1, 2000), 5995-5997.

Louisell, William H., "Coupled mode and parametric electronics", *John Wiley & Sons, Inc.*, New York, (1960).

Morse, Philip M., "Membranes and Plates", in *Vibration and Sound—2nd Edition, Chapter 5*, McGraw-Hill Book Company, Inc., New York,(1948), 172-216.

Nguyen, Clark T., et al., "Tunable, Switchable, High-Q VHF Microelectromechanical Bandpass Filters", *1999 IEEE International Solid-State Circuits Conference. Digest of Technical Papers. ISSCC. First Edition*, (1999), 78-79.

Olkhovets, A., et al., "Non-Degenerate Nanomechanical Parametric Amplifier", *Technical Digest. MEMS 2001. 14th IEEE International Conference on Micro Electro Mechanical Systems*, (Jan. 21-25, 2001), 298-300.

Rugar, D., et al., "Mechanical parametric amplification and thermomechanical noise squeezing", *Physical Review Letters*, 67(6), (2000), 699-702.

Sarid, Dror, in *Scanning Force Microscopy With Applications to Electric, Magnetic and Atomic Forces*, New York Oxford University Press,(1994).

Sidles, J. A., et al., *Reviews of Modern Physics*, 67(1), (1995), 249-265.

Stowe, T. D., et al., "Attonewton force detection using ultrathin silicon cantilevers", *Applied Physics Letters*, 71(2), (Jul. 14, 1997), 288-290.

Timoshenko, S., et al., "Effect of Axial Force on Vibrations of Beams", in *Vibration Problems in Engineering, 4th Edition*, John Wiley & Sons, New York,(1974), 453-455.

Zook, J. David, et al., "Optically Excited Self-Resonant Microbeams", *Sensors and Actuators A*, 52(1-3), (Mar.-Apr. 1996), 92-98.

"U.S. Appl. No. 11/598,097, Non-Final Office Action mailed Mar. 10, 2009", 12 pgs.

"U.S. Appl. No. 11/598,097, Response filed Jan. 12, 2009 to the Restriction Requirement mailed Dec. 12, 2009", 6 pgs.

"U.S. Appl. No. 11/598,097, Response filed Jun. 8, 2009 to Non Final Office Action mailed Mar. 10, 2009", 8 pgs.

\* cited by examiner

HEAT PUMPED PARAMETRIC MEMS DEVICE

GOVERNMENT FUNDING

The invention described herein was made with U.S. Government support under Grant Number DMR-0079992 awarded by National Science Foundation. The United States Government has certain rights in the invention.

FIELD OF THE INVENTION

The present invention relates to microelectromechanical systems (MEMS) and in particular to heat pumped parametric MEMS devices.

BACKGROUND OF THE INVENTION

A conventional electrical amplifier is essentially a variable resistance that uses energy from a direct current (DC) source to increase alternating current (AC) energy. A parametric amplifier uses a nonlinear variable reactance, such as capacitance that varies with time, to supply energy from an AC source to a load. The energy required to vary the capacitance is obtained from an electrical source called a pump. Since reactance does not add thermal noise to a circuit, parametric amplifiers produce less noise than most conventional amplifiers.

Dynamic properties of mechanical resonators can be utilized to create a parametric amplifier. Parametric amplification has long been used as a technique for making a low noise electronic amplifier. The amplification of the applied signal is done by making use of energy from the pump. Parametric amplifiers with a variable-capacitance main-oscillator semiconductor diode are used in radar tracking and communications between Earth stations, satellites, and deep-space stations. The noise temperature of cooled amplifiers is in the range of 20 to 30 K, and the gains are up to 40 dB. This type of amplification is also widely used in optics as well as in electronic traveling wave applications. Parametric amplification is also observed in microelectromechanical systems (MEMS).

Scaling down the dimensions of MEMS into the micron and submicron region shortens the response time down to nanoseconds. A bar clamped at both ends with dimensions 0.2×0.2×2 microns microfabricated from single-crystal silicon exhibits a resonant frequency of 380 MHz, extending the area of MEMS applications into the ultra-high frequency (UHF) region. UHF MEMS devices are expected to replace bulky and power-hungry elements in telecommunication devices, such as quartz oscillators, filters, frequency converters, etc. Since the process of MEMS fabrication is compatible with modern silicon technology, micromechanical devices can be the basis for next generation UHF integrated circuits.

However, the way to transform an electrical signal into mechanical motion and vice versa represents one of the main challenges in MEMS applications. In the most straightforward filter configuration, a MEMS oscillator would be driven electrostatically by an external voltage $V_{ext}$ (signal from antenna), exhibiting mechanical vibrations when $V_{ext}$ has a resonating frequency component. Such an UHV mechanical vibration with nanometer amplitude must be converted back into an electric signal for further processing.

The high frequency of the mechanical motion practically excludes supersensitive but slow detection methods, such as electron tunneling, used in accelerometry or magnetometry. Capacitive and optical detection methods are considered as the most suitable because of their fast response and high sensitivity. An optical method employing a focused laser beam allows a design not overloaded by closely placed electrodes, and also provides reduced cross-talk between driving and detection signals. Interferometric and beam-deflection techniques convert the intensity variation of the reflected laser beam (caused by mechanical motion) into electrical signal with subsequent amplification and measurement by an electric circuit.

Laser wavelength puts a limit on the sensitivity of the interferometric method, making detection of nanometer motion problematic. Signal processing (amplification in this case) on the mechanical level, provided before the mechanic-to-electric conversion by an active UHF micromechanical component, can solve such a problem and is considered as a key point for future MEMS devices.

Parametric amplification represents a means for "mechanical signal processing" in regards to MEMS oscillators. The energy, necessary to gain mechanical motion is provided by periodic modulation of the oscillator's parameter—effective stiffness k. Small mechanical vibrations, induced by a weak external force can be amplified by the parametric mechanism and the enhanced vibrations will be detected optically. Since a "mechanical parametric preamplifier" can be noise-free down to the quantum-mechanical level, it should greatly improve the signal-to-noise ratio of the resulting signal. A mechanical oscillator embedded in a degenerate parametric amplification scheme is also fundamentally interesting because mechanical squeezed states can be produced by such a system: the thermal vibration in one phase of the response can be reduced below the thermal equilibrium level. In MEMS oscillators, the only method that has demonstrated parametric amplification is achieved by modulation of the effective spring constant by superimposing a time-varying electric field between the oscillator and an additional, closely located capacitor plate.

SUMMARY OF THE INVENTION

A micromechanical oscillator has a resonant frequency defined by an effective spring constant that is modified by application of heat. The resonant frequency is varied at a frequency different from the resonant frequency of the oscillator to amplify oscillations. In one embodiment, the oscillator is disc of material supported by a pillar of much smaller diameter than the disc. The periphery of the disc is heated by a laser to provide a time varying shift of the resonant frequency (or equivalently the spring constant or stiffness) of the disc.

A reference signal is used to modulate the intensity of the laser in one embodiment, and thus the stiffness of the disc to provide parametric amplification of sensed vibrations, using heating as a pump. Feedback from movement of the disc is used in a further embodiment.

A method of making an oscillator comprises forming a first sacrificial layer on a substrate followed by a disc layer on top of the first layer. A disc is then formed in the disc layer and the first layer is undercut to form a pillar supporting the disc above the substrate. In one embodiment, the sacrificial layer is formed of silicon oxide and the disc layer is formed of single crystal silicon. Hydrofluoric acid is used to undercut the first layer.

In use, the disc is heated such as by a laser, and vibration of the disc is sensed. The modulation of the intensity of the heating is based on the sensed vibration or a reference signal. In one embodiment, a lower power laser, having a power below a self generation threshold is used to form an amplifier.

In a further embodiment, a power level above the self generation threshold is used to form a generator. No variation of laser intensity is required in the generator embodiment.

An alternative method of sensing vibrations comprises locating one of many different types of micromechanical oscillators proximate a vibrating surface and changing an effective stiffness of the micromechanical oscillator. A reference signal, or vibration of the micromechanical oscillator is sensed and used to modulate the effective stiffness of the oscillator to provide parametric feedback.

In further embodiments, the MEMS oscillator is utilized as an amplifier, antenna, phase demodulator, receiver and laser controlled oscillator. In a receiver embodiment, multiple MEMS of various sizes and hence different resonant frequencies, are located near each other, such as on a substrate. The laser is directed to one of the MEMS depending on the frequency to be received. In further embodiments, the MEMS are formed on a semiconductor substrate, and share a junction, such as a pn junction used to conduct signals.

In still a further embodiment, a bridge structure is used as an oscillator. An AC current is run through the bridge to vary its effective stiffness at a frequency approximately twice the resonant frequency of oscillation of the bridge structure.

DETAILED DESCRIPTION OF THE INVENTION

In the following description and the drawings illustrate specific embodiments of the invention sufficiently to enable those skilled in the art to practice it. Other embodiments may incorporate structural, logical, electrical, process, and other changes. The term MEMS is used interchangeably with micromechanical to represent a class of very small mechanical devices either with or without electrical characteristics. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents. The following description is, therefore, not to be taken in a limited sense, and the scope of the present invention is defined by the appended claims.

Figure 1:
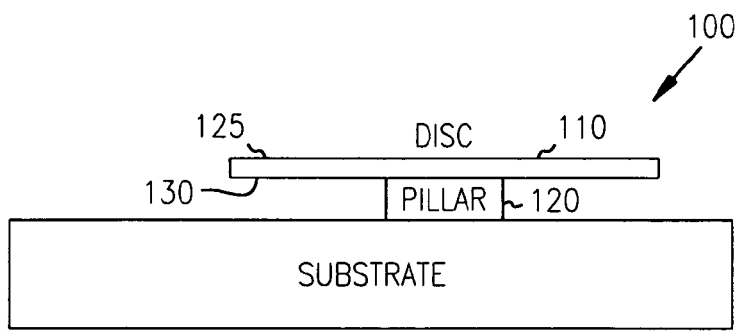
FIG. 1 is a block diagram of a MEMS structure for use as a heat pumped parametric oscillator.

FIG. 1 is a side view representation of a micromechanical oscillator 100. It oscillates in the radio frequency (RF) range and is fabricated in the form of a silicon disc 1110 supported by an $SiO_2$ pillar 120 at the disc center. Other shapes, such as oval or polygons may also be used, and are included in the use of the term disc. An effective spring constant of this oscillator 100 is controlled within the range $\Delta f/f \sim 10^{-4}$ by a low power laser beam ($P_{laser} \sim 100\,\mu W$) 125, focused at the periphery 130 of the disc. Parametric amplification of the disc's vibrations is achieved through a double frequency modulation of the laser power.

In some embodiments, amplitude gains are generally limited by non-linear behavior and self-generation. Phase dependence of the gain inherent in degenerate parametric amplification is also observed. Self-modulation of the CW laser beam ($P_{laser} \sim 100\,\mu W$) provided by placing the disc oscillator into an interference pattern setup can lead to parametric self-excitation.

Oscillators in the RF range are provided. Generally, the smaller the structure, the higher the frequency of oscillation. Modulating the intensity of the focused laser beam 125 provides periodic (at double frequency) changes of the effective spring constant of the oscillator. The dc component of the laser beam is used to detect the vibration (at the fundamental frequency) by interferometric effects. Optical pumping for parametric amplification does not require the oscillator to be conducting and does not need additional electrodes located in proximity to the oscillator. Existing optical detection techniques are easily integrated.

A high quality factor (Q) of the oscillator minimizes the amount of heat required for temperature-related effects noticeable. Avoiding points with high local stress concentration and minimizing clamping losses help to enhance the Q. Cylindrically symmetric oscillators such as discs supported by a single pillar at the center point enhance the Q. Minimizing the diameter of the supporting rod results in the disc approaching the equivalent of a free disc.

In still a further embodiment, a bridge structure is used as an oscillator. MEMS bridge structures are well known in the art. In this embodiment, an AC current is run through the bridge to vary its effective stiffness at a frequency approximately twice the resonant frequency of oscillation of the bridge structure.

Figure 2A:
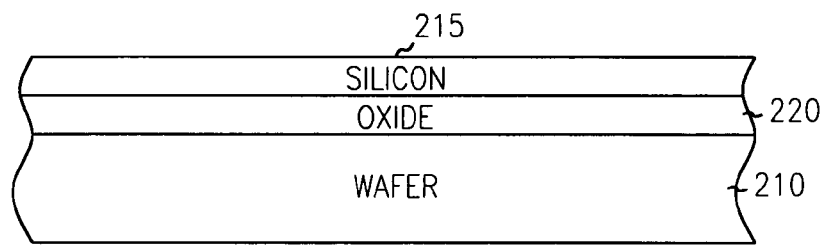
FIGS. 2A, 2B, and 2C illustrate a process of forming the MEMS structure of FIG. 1.
Figure 2B:
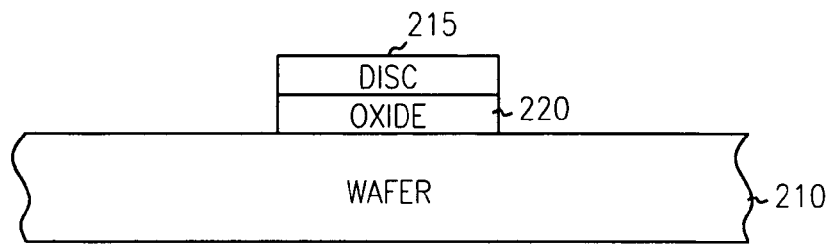
Figure 2C:
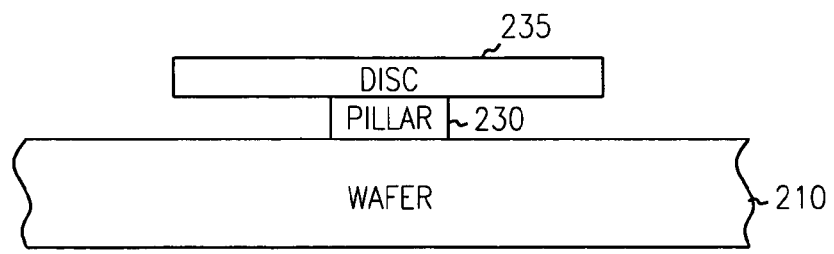

As illustrated in FIG. 2A, commercially available silicon-on-insulator (SOI) wafers 210 with a 250 nm thick silicon layer 215 on top of a 1 micron silicon oxide layer 220 are used in one embodiment for microfabrication. Other thicknesses of the layers are used in various embodiments to produce oscillators that have different resonant frequencies. Discs of radius R from 5 to 20 microns are defined by electron-beam lithography followed by a dry etch through the top silicon layer as shown in FIG. 2B. The radius of the discs also affects the resonant frequency. Dipping the resulting structure into hydrofluoric acid undercuts the silicon oxide starting from the disc's periphery toward the center as shown in FIG. 2C. By timing this wet etch, the diameter of the remaining column of the silicon oxide 230, which supports the released silicon disc 235, is varied. In one embodiment, the diameter of the column is approximately 6.7 microns.

Figure 3:
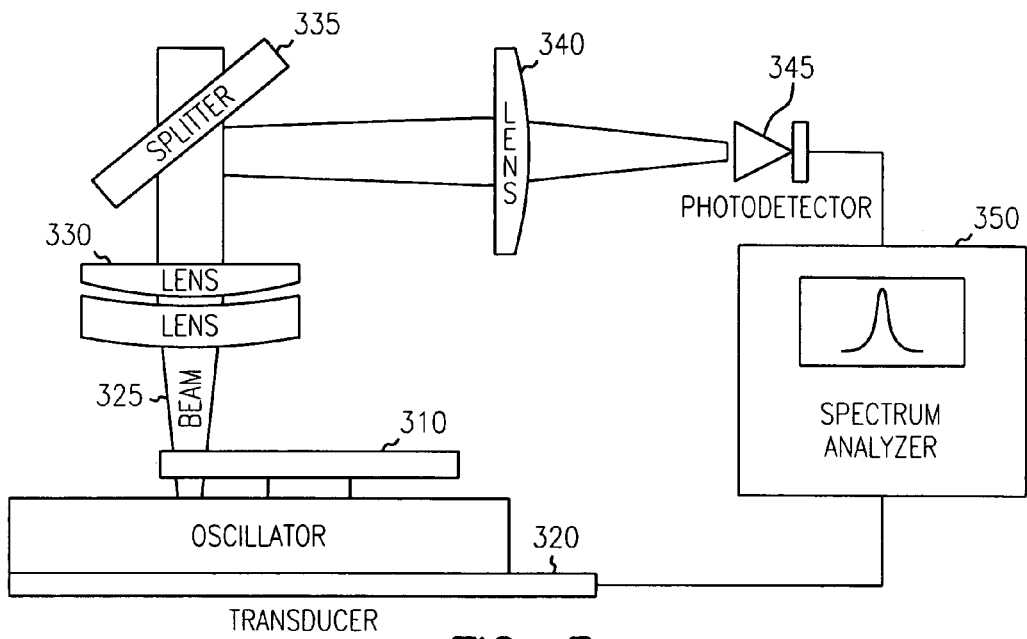
FIG. 3 shows a test structure used to test the MEMS structure of FIG. 1.

After a well-known critical point drying (CPD) process using compressed liquefied gas such as $CO_2$ to push out Ethanol. In one embodiment, fabricated oscillators 310 are glued on a piezoceramic transducer 320 as shown in FIG. 3. For testing, the transducer 320 is placed into a high vacuum chamber ($P=10^{-7}$ Torr). An AC voltage applied to a piezoceramic transducer, attached to the wafer, is used to excite the MEMS oscillators. These oscillations result in the variation of the gap between the disc and the silicon substrate and are detected by an interferometric technique with an He—Ne laser beam 325 focused on the surface of the disc by lenses 330. A beam splitter 335 and lens 340 are used to focus reflected light onto an AC coupled photodetector 345, which provide input to a spectrum analyzer 350.

The following analysis of the signals is shown only to illustrate one possible manner in which the oscillators function. It is not represented as providing an exact model of the operation of the oscillators.

Plate vibrations are described by the fourth-order differential equation:

$$\nabla^4 \eta + \frac{3\rho(1-s^2)}{Eh^2}\frac{\partial^2 \eta}{\partial t^2} = 0 \quad (1)$$

where E is a flexural modulus, s is Poisson's ratio, $\rho$ is the density of the material and h is half-thickness of the plate. Possible solutions of the equation (1) are given by the expressions:

$$Y(r, \varphi) = \begin{matrix}\cos\\ \sin\end{matrix}(m\varphi)[AJ_m(\gamma r) + BI_m(\gamma r)] \quad (2)$$

Figure 4:
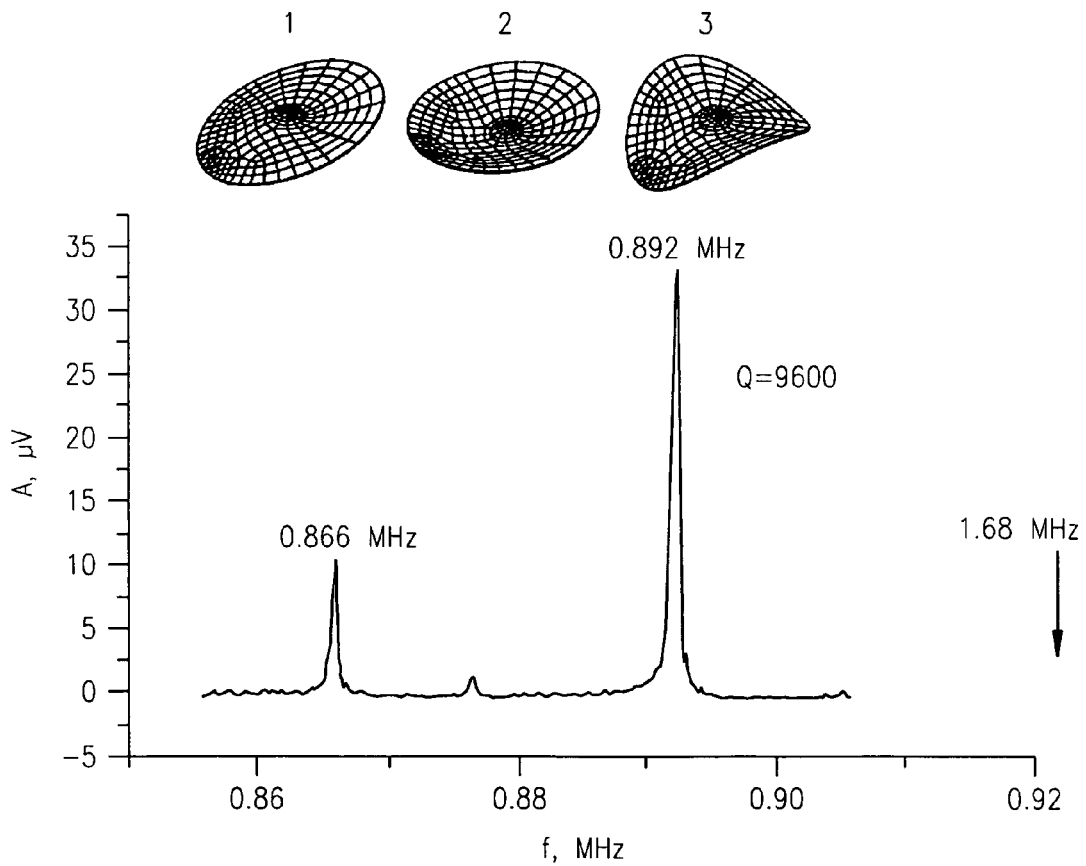
FIG. 4 illustrates three modes of vibrations for the MEMS structure of FIG. 1.

Coefficients A, B and $\gamma_{mn}$ are defined by choosing boundary conditions (displacement and first derivative should be zeroed around the pillar while no bending or shearing forces exist on circumference of the disc). FIG. 4 illustrates three modes of vibrations corresponding to $\gamma_{10}$, $\gamma_{00}$ and $\gamma_{20}$ marked as 1,2,3 respectively. For the structure (R=20 µm, r=6.7 µm), the highest quality factor 11,000 is observed for the mode $\gamma_{00}$ of the disc oscillations with a frequency of 0.89 MHz.

A low power laser beam (He—Ne, $P_{incident}$~100 µW) focused on the periphery of the disc is an effective tool to control the resonant frequency of the disc oscillator. Modes $\gamma_{00}$ and $\gamma_{10}$ demonstrate linear increase of the stiffness with the increased laser power, which is quite counterintuitive. At the same time, an expected decrease of the resonant frequency (i.e., softening) is observed for the high-frequency mode $\gamma_{20}$.

Analysis of the thermal stress induced within the disc by the focused laser beam provides the explanation of the observed resonant frequency behavior. For qualitative understanding, consider a simpler problem, a cylinder heated uniformly, with the inner diameter constrained, i.e., the displacement equals zero. (This models the constraint effect that the oxide pillar has on the Si disk.) One can solve this problem in two steps. First heat the cylinder and allow it to expand stress free. Then negative pressure should be applied to pull the inner diameter back to its starting dimension. This tension shifts the resonant frequency of the disc vibration.

Modulation of the laser beam intensity provides periodic change of the effective stiffness. Time-varying parameter causes mixing of two different modes of vibrations (in a same way as non-linear circuit provides mixing of two different modes of vibrations). That mixing allows energy supplied to the system at one frequency to be converted to another. For the case of degenerate parametric amplifier, the modes to be coupled are two counter-rotating ones. Providing pumping frequency equal to the sum of the frequencies (which is a double frequency for the degenerate case), the pumping energy is fed into vibration at the fundamental frequency.

The high quality factor of the oscillator implies that small energy losses due to internal friction, clamping losses, etc. could be compensated by some low power external source of energy, leading to enhanced mechanical oscillations. Gain dependence on the phase shift $\phi$ between stiffness modulation $\Delta k(t)$ and driving force F(t), following from the equation is also obvious from energetic consideration. In order to provide amplitude gain, the increase of the stiffness $\Delta k$ should occur around maximum of deflection, thus contributing to potential energy $E_p = (k+\Delta k)x^2$.

Figure 5:
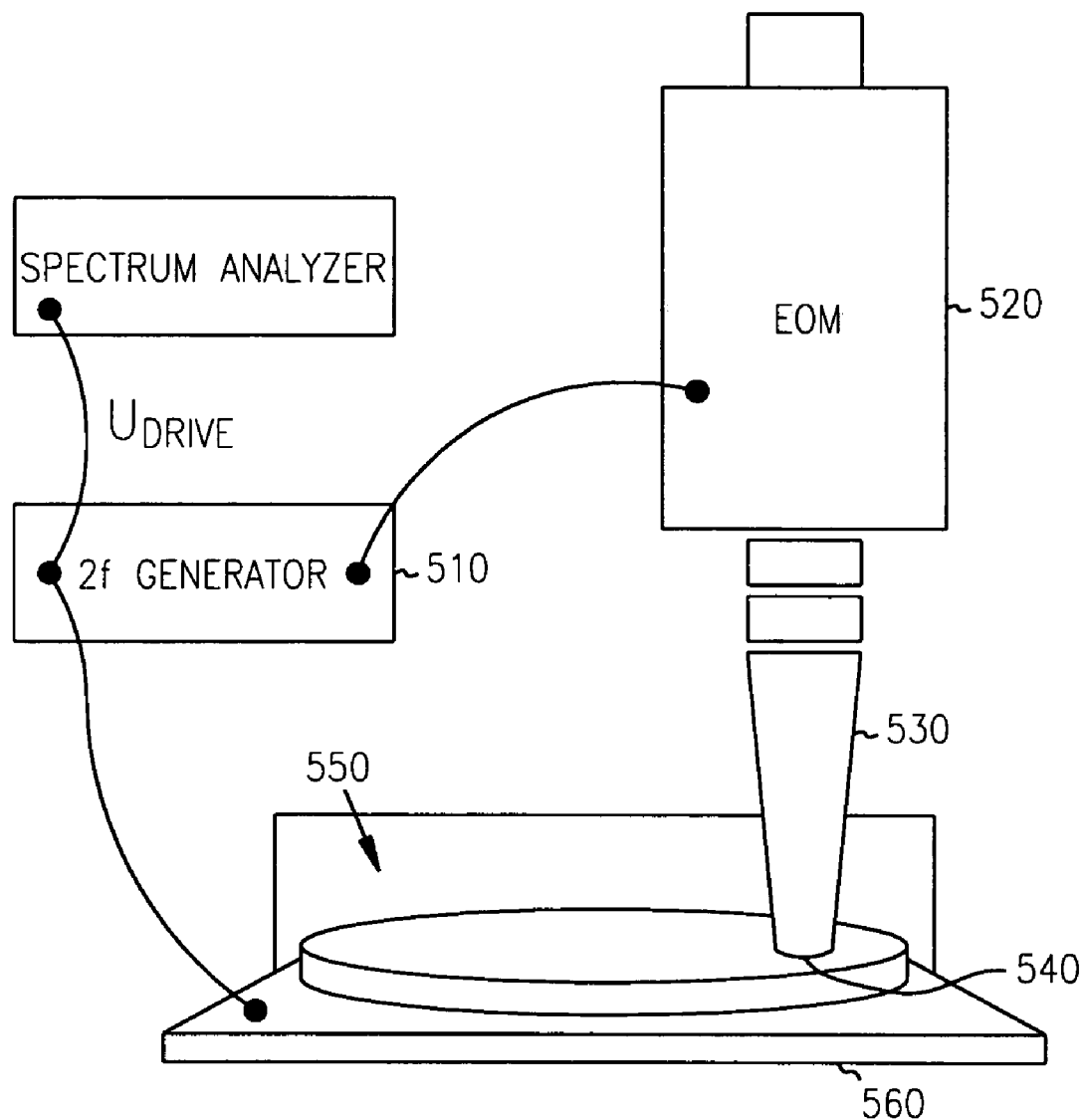
FIG. 5 is a block schematic diagram of a MEMS oscillator configured as a phase locked amplifier

In one example, synchronization of the stiffness modulation with the motion of the oscillator was achieved by using the ac piezodrive voltage $V_{piezo}$ as a reference signal. A schematic diagram is shown in FIG. 5. An external generator 510 produces a double frequency ac voltage, phase locked with $V_{piezo}$. This voltage after amplification and phase shift is used to control an electro-optical modulator 520 (EOM), which, by partial modulation, provides the double-frequency ac component of the intensity of a He—Ne laser beam 530 focused on a <5 micron spot 540 on the surface of the disc oscillator 550 mounted on a Piezo drive 560. With this parametric drive, approximately a thirty times increase of the amplitude of the mechanical vibrations was detected, when the ac component of the laser beam was increased to 100 microWatt (the AC power absorbed by the disc can be estimated as approximately 25 microWatt). With a fixed amplitude of the optical pump (fixed gain of the parametric amplification) the system demonstrates linear mechanical response to the piezodriving voltage. The maximum observable gain is limited by the self-generation of the system. Focus of the laser beam at the periphery of the disc appears to provide the best conditions for amplification.

Heat absorption and thermal stress-induced stiffness modulation are the dominant mechanisms by which the laser beam interacts with the oscillator. Temperature-induced strain could be also accompanied by the stress created by photo-generated carriers. This photo-induced stress in MEMS oscillator can be considered as another way to provide parametric amplification at high frequencies and low light intensity. By optimizing the laser wavelength and using a multilayer design for the oscillator, one can significantly reduce the necessary laser power.

Periodic modulation of the laser beam provides time-varying stiffness of the oscillator. It is achieved by an external electro-optical modulator in one embodiment. However, the disc is part of an interferometric device, the gap between the disc and substrate affects the light intensity within the cross section of the disc (and hence—absorbed heating power) by changing interference conditions for reflected beams. Oscillation of the disc (initiated thermally for example) can cause modulation of the local disc heating even for CW laser beam. Non-linear dependence of the heating power versus gap value provides the presence of the second harmonic, necessary for parametric amplification. Phase shift between original mechanical vibrations and light modulation depends on the initial position of the disc within interferometric fringes. If starting conditions and laser beam intensity are chosen properly—self-amplification up to generation will occur.

Figure 6A:
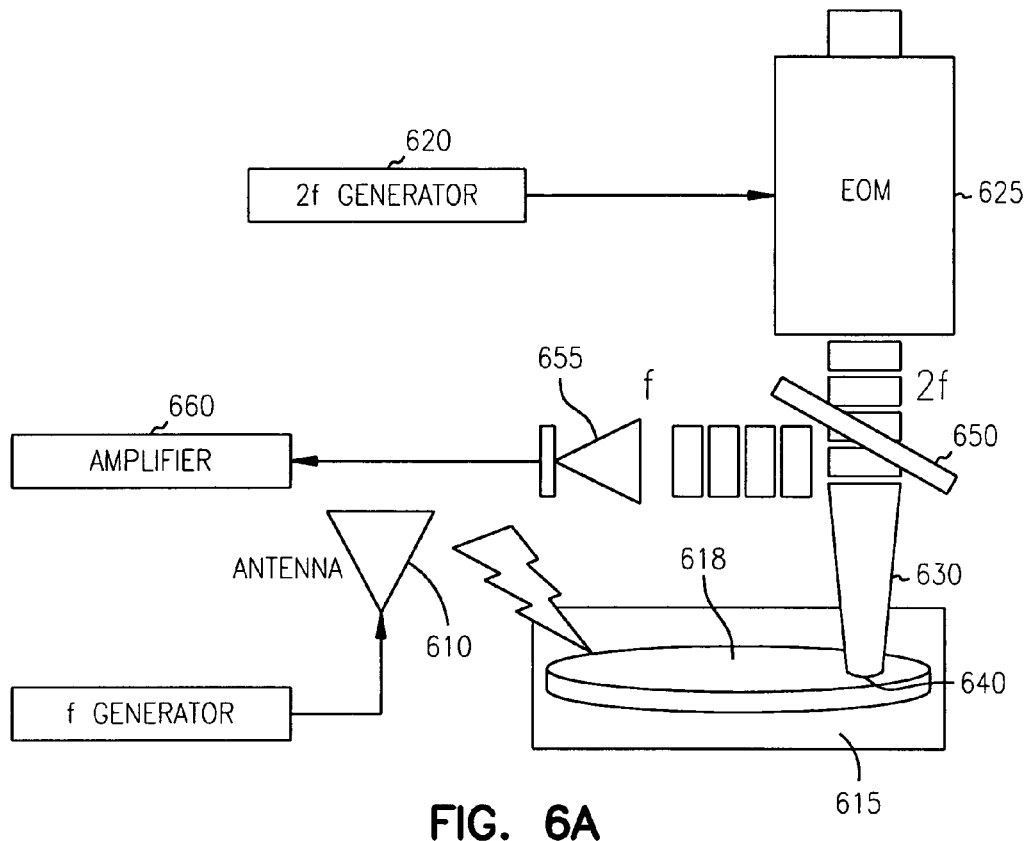
FIGS. 6A and 6B are block/schematic diagrams of the MEMS oscillator used as a receiver with an antenna.
Figure 6B:
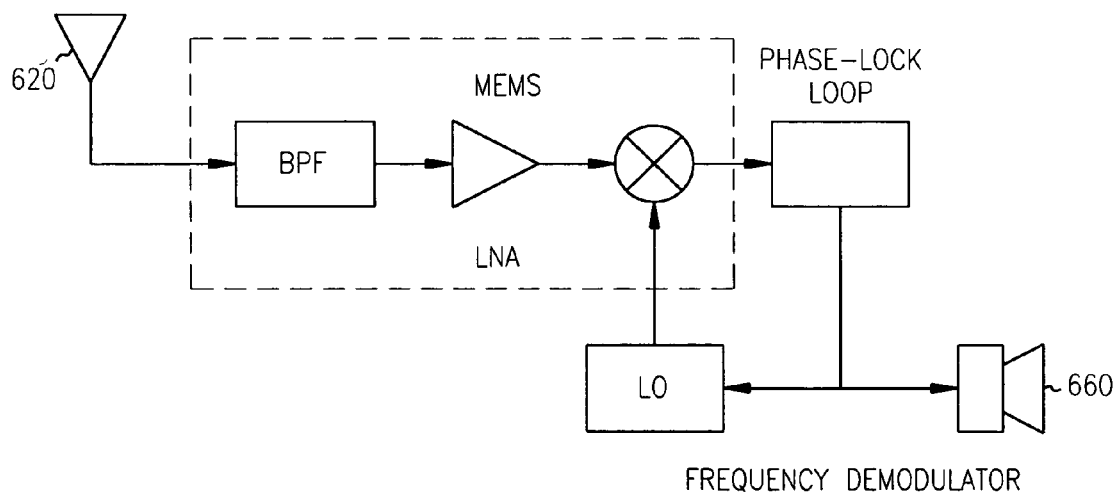

FIGS. 6A and 6B are block/schematic diagrams of the resonator driven by electromagnetic waves. The oscillator serves as an antenna, amplifier and phase demodulator. An antenna 610 provides an electromagnetic excitation signal to a disc oscillator 618. An external generator 620 produces a double frequency ac voltage. This voltage after amplification and phase shift is used to control an electro-optical modulator 625 (EOM), which, by partial modulation, provides the double-frequency ac component of the intensity of a He—Ne laser beam 630 focused on a <5 micron spot 640 on the surface of the disc oscillator 618. A beam splitter 650 provides light reflected from the disc to a photodetector 655 having an output signal provided to an amplifier 660.

FIG. 6B is a schematic diagram of the configuration, illustrating its operation as a phase detector with an external phase-lock loop for frequency demodulation.

Figure 7:
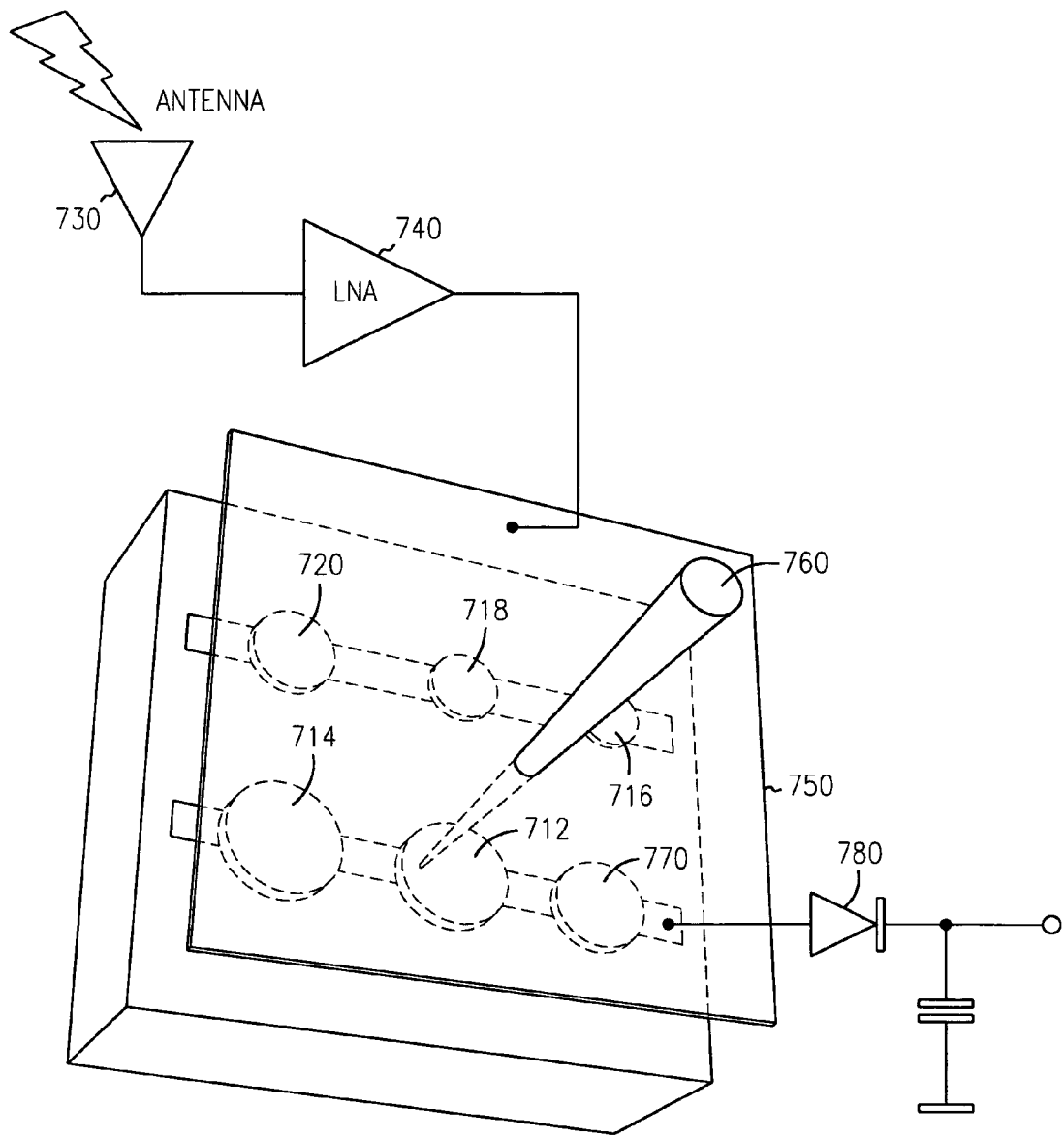
FIG. 7 illustrates a MEMS oscillator used in a homodyne receiver.

FIG. 7 illustrates a homodyne MEMS based receiver. An array of various size MEMS oscillators 710, 712, 714, 716, 718, and 720 are shown mounted on a substrate. An antenna 730 receives RF signals and provides them through a low noise amplifier 740 to drive a microwave strip line 750, providing an oscillating electric field to drive the oscillators. A laser beam 760 is focused on a selected oscillator disc to effectively tune the receiver to the resonant frequency of the disc. In one embodiment, a pn junction 770 is coupled to each oscillator to provide signals from the selected oscillator to an inventor 780 for providing an amplified output of the receiver.

Figure 8:
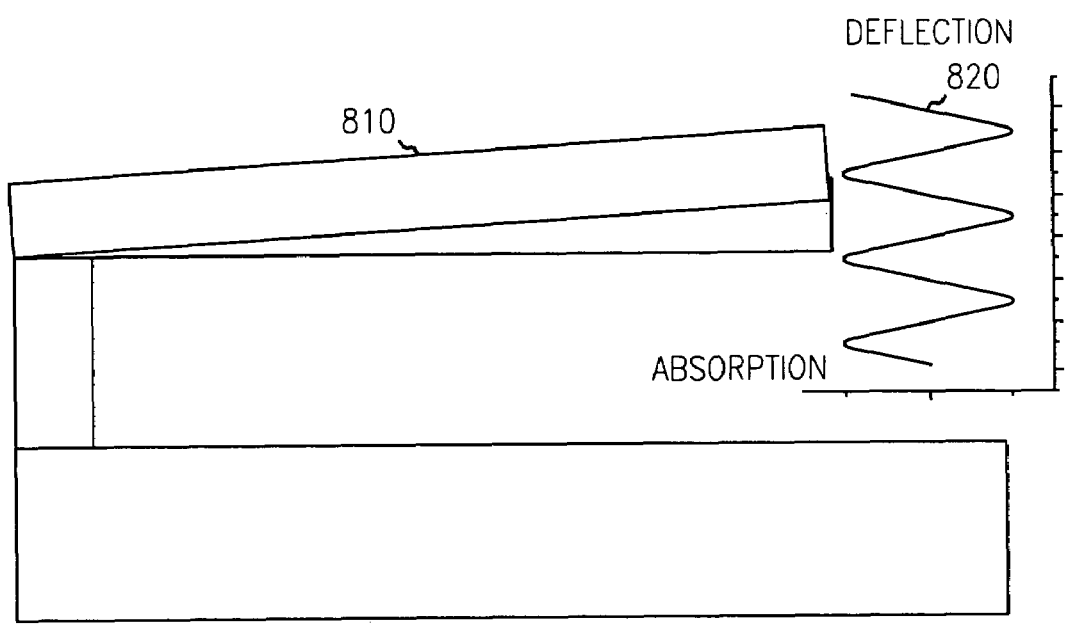
FIG. 8 illustrates the use of an interferometric pattern to modulate heat absorption in an MEMS oscillator.

FIG. 8 shows a portion of disc oscillator having a peripheral portion 810 deflecting through an interferometric pattern represented at 820. Heat absorption is modulated by motion through the interferometric pattern as the peripheral portion 810 deflects through it. Modulation occurs at twice the frequency of the mechanical motion of the peripheral portion 810. No external modulation is required, and autoparametric excitation is obtained.

CONCLUSION

Parametric amplification with optical pumping was realized for radio frequency MEMS oscillator. A gain of 30 and effective quality factor Q=65,000 are demonstrated. Incorporation of parametric amplification into a signal processing for UHF MEMS devices is considered as a main goal. More generally, the parametrical amplification, described in this paper is a method to be used when small mechanical vibrations need to be detected. An enhanced quality factor and amplitude-phase dependence of a light-driven oscillator can be utilized for filtering, or when precise measurements of the frequency are necessary (for example, mass detection experiments). Parametric self-excitation of the MEMS oscillator by CW laser beam was demonstrated for the first time.

The invention claimed is:

1. A micro-electrical mechanical resonator comprising:
    a substrate;
    a plate adapted to vibrate, such that changes in the temperature of the plate modify its effective spring constant;
    a single pillar coupled to the-plate about a center of the vibrating plate and supporting the vibrating plate above the substrate;
    a sensor that senses motion of the plate; and
    a varying intensity laser positioned to heat the plate with a variation of intensity as a function of the sensed motion of the plate.

2. The micro-electrical mechanical resonator of claim 1 wherein the laser provides a beam having a varying intensity and is focused near the periphery of the plate.

3. The micro-electrical mechanical resonator of claim 2 wherein the plate has a resonant frequency, and wherein the varying intensity of the beam is approximately twice the resonant frequency.

4. The micro-electrical mechanical resonator of claim 3 with laser power below self generation threshold comprising a resonance force sensor.

5. The micro-electrical mechanical resonator of claim 3 with laser power above the self generation threshold comprising a generator.

6. The micro-electrical mechanical resonator of claim 1 wherein the plate is formed of single crystal silicon and the pillar is formed of silicon oxide.

7. The micro-electrical mechanical resonator of claim 1 and further comprising a laser that provides a parametric optical pumping of the plate at approximately twice its resonant frequency.

8. The micro-electrical mechanical resonator of claim 1 wherein the pillar has two ends, and wherein one end is coupled to the substrate, and the other end is coupled to the plate at approximately the center of the disc.

9. The micro-electrical mechanical resonator of claim 8 wherein the pillar is approximately orthogonal to the substrate.

10. The micro-electrical mechanical resonator of claim 1 wherein the plate is circular in shape.

11. The micro-electrical mechanical resonator of claim 1 wherein the plate comprises a cylindrically symmetric oscillator.

12. The micro-electrical mechanical resonator of claim 1 wherein the pillar is sufficiently small in diameter such that the plate is effectively a free disc oscillator.

13. A micro-electrical mechanical resonator comprising:
    a substrate;
    a vibrating plate, wherein the plate comprises a bridge, such that changes in the temperature of the bridge modify its effective spring constant;
    a varying intensity laser positioned to heat the plate;
    a sensor that senses motion of the plate; and
    a frequency multiplier driving the variation of the intensity of the laser based on the sensed motion of the plate.

14. The micro-electrical mechanical resonator of claim 13 wherein AC current or a laser is used to change the temperature of the plate.

* * * * *

UNITED STATES PATENT AND TRADEMARK OFFICE
CERTIFICATE OF CORRECTION

PATENT NO. : 7,654,140 B2 Page 1 of 1
APPLICATION NO. : 10/097178
DATED : February 2, 2010
INVENTOR(S) : Zalalutdinov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 802 days.

Signed and Sealed this

Twenty-eighth Day of December, 2010

David J. Kappos
*Director of the United States Patent and Trademark Office*